United States Patent [19]

Rohosky et al.

[11] Patent Number: 4,894,849
[45] Date of Patent: Jan. 16, 1990

[54] APPARATUS AND METHOD FOR TRANSFERRING NUCLEAR REACTOR FUEL ASSEMBLIES

[75] Inventors: Thomas L. Rohosky, West Mifflin; Kenneth J. Swidwa, N. Versailles; James R. Marshall, Penn Hills, all of Pa.

[73] Assignee: Westinghouse Electric Corp., Pittsburgh, Pa.

[21] Appl. No.: 252,218

[22] Filed: Sep. 30, 1988

[51] Int. Cl.⁴ .............................................. G21C 19/10
[52] U.S. Cl. .................................... 376/268; 212/149; 340/685
[58] Field of Search ............... 376/271, 268, 264, 270, 376/277, 245, 258; 212/149–155; 364/153, 463; 340/685; 294/906; 414/146

[56] References Cited

U.S. PATENT DOCUMENTS

| | | | |
|---|---|---|---|
| 3,740,741 | 6/1971 | Jones | 340/272 |
| 3,854,593 | 12/1974 | Gross | 212/39 R |
| 3,913,081 | 10/1975 | Hamilton | 340/272 |
| 4,212,006 | 7/1980 | Cakebread et al. | 340/685 |
| 4,487,741 | 12/1984 | Vackovich et al. | 376/271 |
| 4,532,595 | 7/1985 | Wilhelm | 212/153 |
| 4,761,107 | 8/1988 | Franti | 414/146 |
| 4,781,882 | 11/1988 | Salton et al. | 376/271 |

Primary Examiner—Daniel Wasil
Attorney, Agent, or Firm—E. F. Possessky

[57] ABSTRACT

A system for transferring fuel assemblies in a nuclear reactor includes a load control system which compares the current load to the more restrictive of fixed overload and underload limits, and instantaneous overload and underload limits continuously calculated from a running average of the measured load. Operation of the refueling machine is terminated if any of these limits are exceeded. The system also accommdates for changes in buoyancy and tension loading applied by spring loaded reels for pneumatic hoses and electrical cables servicing the gripper which engages the fuel assembly as the mast supporting the fuel assembly is raised and lowered in the pool of shielding water covering the reactor core. The current and recent suspended load measurements are displayed relative to the fixed and instantaneous overload and underload limits on a graphic display along with speed and other pertinent data.

18 Claims, 6 Drawing Sheets

APPARATUS AND METHOD FOR TRANSFERRING NUCLEAR REACTOR FUEL ASSEMBLIES

BACKGROUND OF INVENTION

1. Field of Invention

This invention relates to a nuclear reactor refueling machine load control system. Such systems monitor the load imposed on the refueling machine as it inserts and removes fuel assemblies from a reactor core immersed in a shielding pool of water and terminates operation of the refueling machine when the sensed load exceeds specific limits indicative of a snag or obstruction in the path of the fuel assembly. More particularly, the invention relates to such a system which more accurately determines the load by taking into account the variations in buoyancy resulting from changes in the degree of immersion of the mast lifting the fuel assemblies, and the change in tension load imposed by spring biased reels for hoses and cables providing pneumatic and electrical services to the grippers on the lower end of the mast. The invention is also directed to a novel technique of protecting the fuel assembly being transported by detecting deviations in the instantaneous load from a running average of the load.

2. Background Information

Fuel assemblies are inserted in and removed from the core of a nuclear reactor and moved within containment by a refueling machine. A typical refueling machine includes a movable mast suspended by a cable inside a fixed mast. The movable mast is equipped at its lower end with grippers which engage the upper end of a fuel assembly.

The fuel assemblies comprise a number of fuel rods connected together at intervals by grid straps. As the gripper mast is raised and lowered by the cable to remove and insert fuel assemblies in the reactor core, the grid straps can become hung-up on adjacent assemblies o other obstacles. Continued raising of a hung-up fuel assembly can impose damaging forces on the grid straps. Similarly, a continued attempt to lower a hung-up fuel assembly, applies more of the suspended load to the grid strap which is caught also resulting in damage to the fuel assembly.

In order to detect hung-up fuel assemblies, a load sensor monitors the suspended load and terminates raising of the mast when an overload limit is exceeded. Some systems also terminate lowering of the mast if an underload limit is exceeded. Such a system is disclosed in U.S. Pat. No. 4,487,741.

Currently, the overload and underload limits are fixed limits set by the manufacturer of the fuel cells. However, these fixed limits do not take into account the many variables encountered by a load control system. Foremost is the variation between the types of fuel assemblies. Typically, the fuel assemblies in a particular reactor all have the same basic configuration which includes thimble tubes interspersed in an array of fuel rods. In some assemblies, groups of control rods called rod control clusters are movably inserted in the thimble tubes for controlling the reactivity of the reactor. In other fuel assemblies, reactivity sources are inserted in the thimble tubes, in others burnable poison occupies the thimble tubes. In still others, the thimble tubes are merely plugged. These different inserts can cause variations of as much as about 160 pounds in a fuel assembly that nominally weighs about 1600 pounds dry. The fixed manufacturer limits do not take into account these variations in the weight of the different fuel assembly configurations.

Other variables which affect the sensed load on the refueling machine include buoyancy changes. While the fuel assemblies remain fully immersed in water which provides radiation shielding, the mast is only partially immersed when fully raised. This results in a decrease in the sensed load as the mast is lowered and more of its weight is supported by the buoyancy provided by the water. In addition, the grippers on the bottom of the movable mast are typically operated by compressed air through electrically controlled valves. The associated air hoses and electrical cables are wound on spring biased reels so that as the mast is lowered and the hose and electrical cable reel out, tension forces of increasing magnitude are applied to the mast. These tension forces also reduce the sensed load as the mast is lowered.

Neither the change in buoyancy nor the tension load applied by the hose and electrical cable reels is accounted for in present refueling machine load control systems.

On some refueling machines, playing out of the cable supporting the mast results in an increase in the sensed load as the mast is lowered. While this change in the sensed load is opposite to the buoyancy change and tension loading by the hose and electrical cable reels, the latter two effects dominate, so that even where the suspended cable load increases, the sensed load decreases as the mast is lowered.

Since the current refueling machine load control systems do not account for changes in buoyancy, tension loading or, where applicable, changes in hoist cable loading, they can provide overprotection under some circumstances and under protection in others. For instance, since buoyancy changes and tension loading reduce the sensed load for a nearly fully immersed mast, the system operates closer to the underload limit under these conditions. Thus, slight resistance to lowering the mast further can cause a nuisance trip. On the other hand, the reduction in the sensed load near the full down position requires increased resistance to raising the mast before the overload limit is exceeded. This can result in damage to the fuel assembly before movement of the mast is terminated.

There is a need, therefore, for a refueling machine load control system which more accurately detects hang-ups and obstructions in the path of fuel assemblies being transported by the machine.

There is also a need for such a system which takes into account the variations in configuration of the fuel assemblies.

There is a further need for such a system which accommodates for variations in load attributable to the changing degree of immersion of the suspended load in the shielding water covering the reactor core.

There is still further a need for such a system which takes into account the effects of the changing tension loading produced by the spring biased reels for the pneumatic hoses and electrical cables servicing the grippers which engage the fuel assemblies.

There is, in addition, a need for such a system which takes into account, where applicable, changes in the suspended load attributable to the cabling supporting the refueling machine mast.

SUMMARY OF THE INVENTION

These and other needs are satisfied by the invention which is directed to apparatus and a method of transferring fuel assemblies to and from a nuclear reactor core in which the suspended load supported by a refueling machine is repetitively measured and the repetitive measurements are used to generate a running average of the suspended load. The current value of the suspended load is compared with this running average and operation of the refueling machine is inhibited when this current value of the suspended load differs from the running average by more than a selected limiting amount.

In the preferred form of the invention, a digital computer is programmed to generate the running average from successive current samples of the suspended load and overload and underload limits are generated by adding and subtracting, respectively, predetermined selected loads to and from the running average. The running average of the suspended load can be calculated as the average value of a preselected number of the most recent load samples or, by adding to the running average as previously generated a preselected fraction of the difference between the previously calculated running average and the value of the current sample. Preferably, a current suspended load measurement is only used in generating a running average if the height of the suspended load has changed by a preselected minimum amount from the height at which the previous suspended load measurement was taken.

Another aspect of the invention is directed to apparatus and a method of adjusting the overload and underload limits for changes in buoyancy of the mast supporting the fuel assembly as its degree of immersion in the shielding water covering the reactor core varies, and for changes in the tension load applied to the mast by spring tensioned reels for the service lines providing services such as pneumatic pressure and electrical signals to the grippers mounted on the lower end of the mast which engage the fuel assembly to be transferred. Accommodation can also be made for changes in suspended load in refueling machines in which the load cell measuring the suspended load supports the cable sheave so that the contribution of the weight of the cable to the suspended load changes with height.

In the preferred form of the invention, the amount by which the suspended load varies with height, due to such effects as changes in buoyancy, tension loading from the reels for servicing lines, and the length of the hoist cable contributing to the suspended load, is determined by moving the suspended load through full travel without any obstructions or hangups, and recording as a stored function the suspended load at selected heights. Adjustments to the underload and overload limits are then made by determining the amount by which the suspended load varies at the measured height from the stored function.

BRIEF DESCRIPTION OF THE DRAWINGS

A full understanding of the invention can be gained from the following description of the preferred embodiment when read in conjunction with the accompanying drawings in which.

DESCRIPTION OF THE PREFERRED EMBODIMENT

Figure 1:
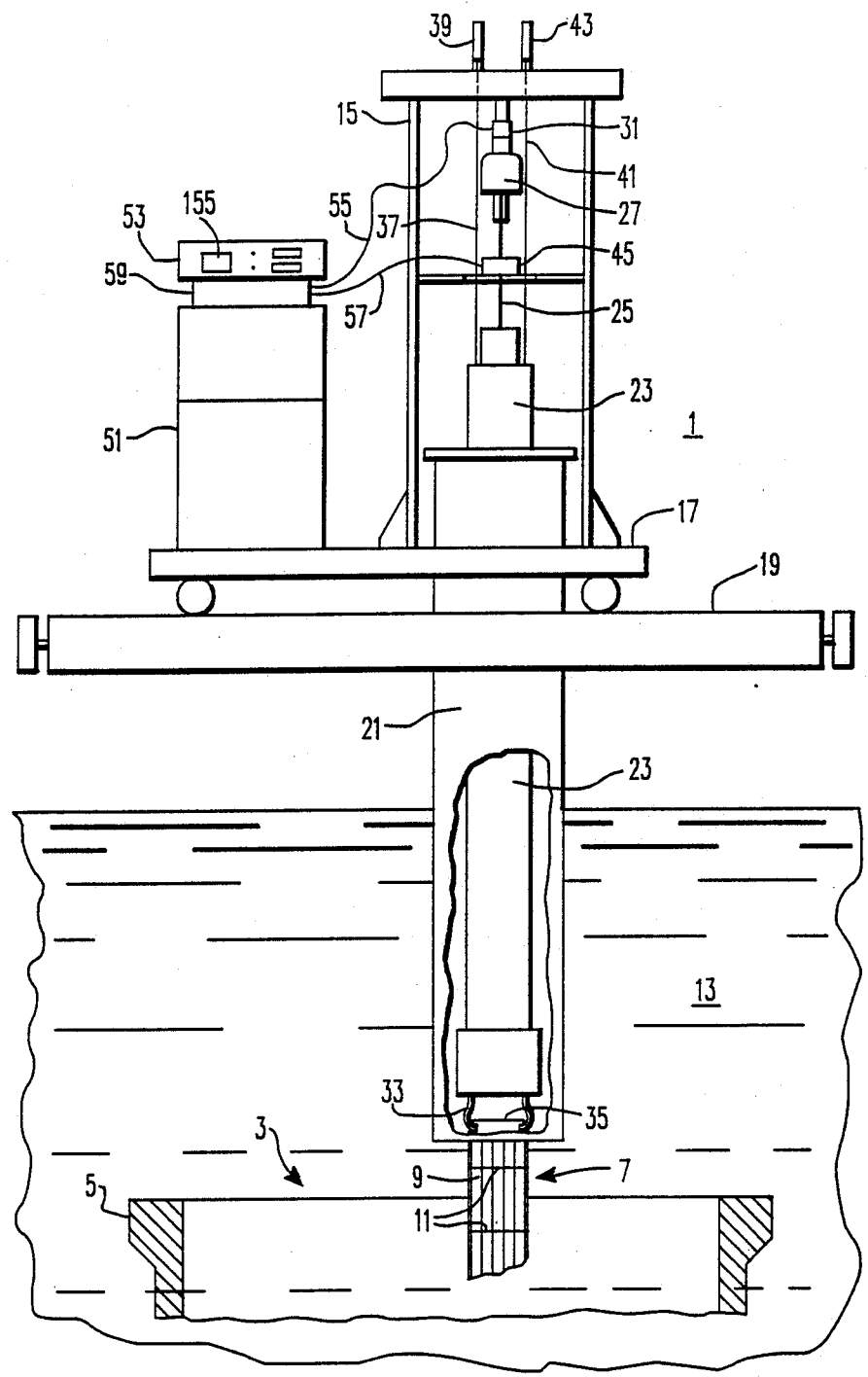
FIG. 1 is a front elevation view of a refueling machine incorporating the invention as viewed along a vertical section through a nuclear reactor installation.
Figure 2:
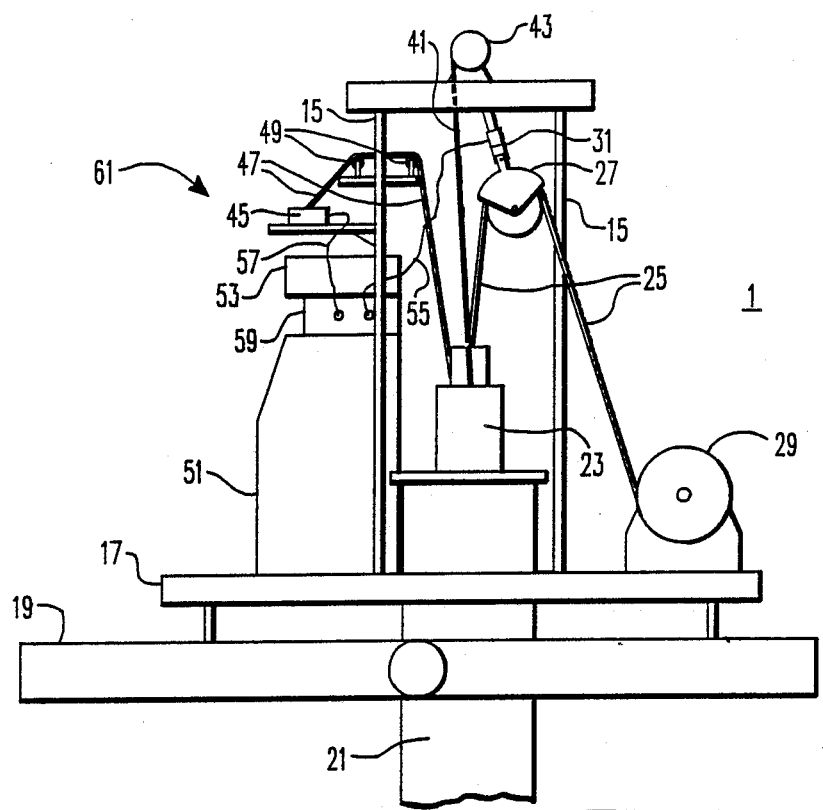
FIG. 2 is a right side elevation view of the refueling machine of FIG. 1 incorporating the invention.

Referring to FIGS. 1 and 2, the invention is shown as applied to a refueling machine 1 for a nuclear reactor 3. The reactor 3 includes a reactor vessel 5 in which are arranged a number of fuel assemblies, such as shown at 7. The fuel assemblies 7 include an array of fuel rods 9 supported at spaced intervals by grid straps 11. During refueling, the reactor is immersed in water 13 which serves as a shield to absorb radiation emitted by the fuel rods 9. The fuel assemblies 7 remain completely immersed during the refueling operation as they are transported to and from the reactor vessel 5.

The fuel assemblies 7 are inserted into and removed from the vessel 5 by the refueling machine 1 which includes a mast support structure 15 mounted on a trolley 17. The trolley 17 is movable along a bridge 19 which in turn is movable transverse to the direction of trolley movement to provide the capability of positioning the mast support structure 15 any desired horizontal location within the limits of trolley and bridge travel.

The refueling machine 1 further includes a stationary mast 21 which extends downward from the trolley 17 into the water 13. A telescoping gripper mast 23 is suspended inside the stationary mast 21 by a hoist cable 25 which is reeved over a sheave 27 and wound on the drum of a hoist 29. The sheave 27 is connected to the mast support structure 15 through a load cell 31 which measures the suspended load.

At the lower end of the gripper mast 23 is a gripper 33 which engages the upper end 35 of the fuel assemblies 7. The gripper 33 is operated by pneumatic pressure through solenoid valves (not shown). Pneumatic fluid is supplied to the gripper through a hose 37 wound on a spring tensioned hose reel 39 mounted on top of the mast support structure 15. An electric cable 41 wound on a spring tensioned cable reel 43 also mounted on top of the mast support structure 15 supplies electric power to the gripper solenoid valves.

The vertical position of the gripper mast 23, which is raised and lowered by the hoist 29 is detected by a position transducer 45 mounted on the mast support structure 15. The position transducer 45 is a potentiometer which is rotated by a spring tensioned transducer tape 47 reeved over tape sheaves 49 and connected to the gripper mast 23 so that the setting of the potentiometer is a function of the vertical position of the gripper mast.

The refueling machine 1 is operated from a console 51 mounted on the the trolley 17. A load control system computer 53 receives inputs from the load cell 31 and position transducer 45 carried by cables 55 and 57 respectively through an interface box 59. This interface box 59 also permits the computer 53 to communicate with the console 51.

In operation, the trolley 17 and bridge 19 are operated to position the gripper mast 23 over a selected fuel assembly 7. The hoist 29 is then operated to lower the gripper mast 23 so that the gripper 33 can engage the selected fuel assembly 7. Next, the gripper mast 23 is raised by the hoist 29 until the fuel assembly 7 is clear of the reactor vessel 5. The trolley 17 and bridge 19 are then operated to transport the selected fuel assembly to the desired location. While the fuel assembly 7 remains fully submerged in the shielding water 13 throughout the transfer operations, the degree of immersion of the gripper mast 23 varies throughout the lift, resulting in variation in the suspended load measured by the load cell 31. The measured load is also affected by the tension loading produced by the spring tensioned pneumatic hose reel 39 and the electric cable reel 43. The spring tensioned position transducer 45 also generates some tension loading, but it is negligible in comparison. All these effects tend to reduce the measured load as the gripper mast 23 is lowered. However, at the same time, playing out of the hoist cable 25 adds to the suspended load, but with lesser effect. The net result is that the measured load decreases as the fuel assembly 7 is lowered.

The load control system 61 which includes the load cell 31, position transducer 45, the computer 53 and its interface 59, and their associated components, monitors the load supported by the hoist cable 25. The monitored load is compared with certain load limits, and a signal is sent to the console 51 to terminate hoist operation if these limits are exceeded.

The limits with which the measured load is compared include: overload limits which would indicate an obstruction or hang-up while the fuel assembly was being raised, and underload limits which are an indication that there is an obstruction or hang-up while the fuel assembly is being lowered and has not yet reached its seated position.

The present invention utilizes two sets of load limits: the fixed limits set by the manufacturer of the fuel assemblies, and a unique set of instantaneous limits which take into account the particular configuration of the fuel assembly to be lifted and the dynamic components of load measurement mentioned above. The system selects the set of limits which is more restrictive at the given instant.

As mentioned previously, the manufacturer's limits do not take into account the various configurations of the fuel assemblies; that is, whether they incorporate rod control clusters, sources, et cetera. The manufacturer's limits also do not take into account changes in buoyancy or the tension loading applied by the spring tensioned pneumatic hose and electric cable reels 39 and 43 respectively.

In determining the instantaneous limits of the present invention, the measured load is repetitively sampled and a running average is maintained. The instantaneous overload and underload limits are the calculated running average load plus and minus allowable load variations. To avoid incorrect averages, the running average load is only updated if the gripper mast 23 has moved a minimum distance since the last update, and the new weight is not excessively different from the average. The running average can be calculated in various ways, for instance, by averaging together the last N number of load measurements. As an alternative, the running average can be calculated by adjusting that average by a fraction of the difference between the new load measurement and the previous average. For an example of the latter method, if the average is 2,000 pounds and the new measurement is 2,100 pounds, set the average equal to 2,010 pounds.

Corrections for changes in buoyancy and tension load with height are stored in the memory associated with the computer 53 along with the weights for the various configurations of the fuel assemblies. Preferably, the corrections are determined empirically by recording the loads measured at various heights for a fuel assembly which is not hung-up or obstructed. While the principal variables which affect changes in loading with height are the change in buoyancy, the tension loading and the amount of suspended cable, the empirical technique produces corrections which take into account all effective variables on suspended load as a function of height.

Figure 3:
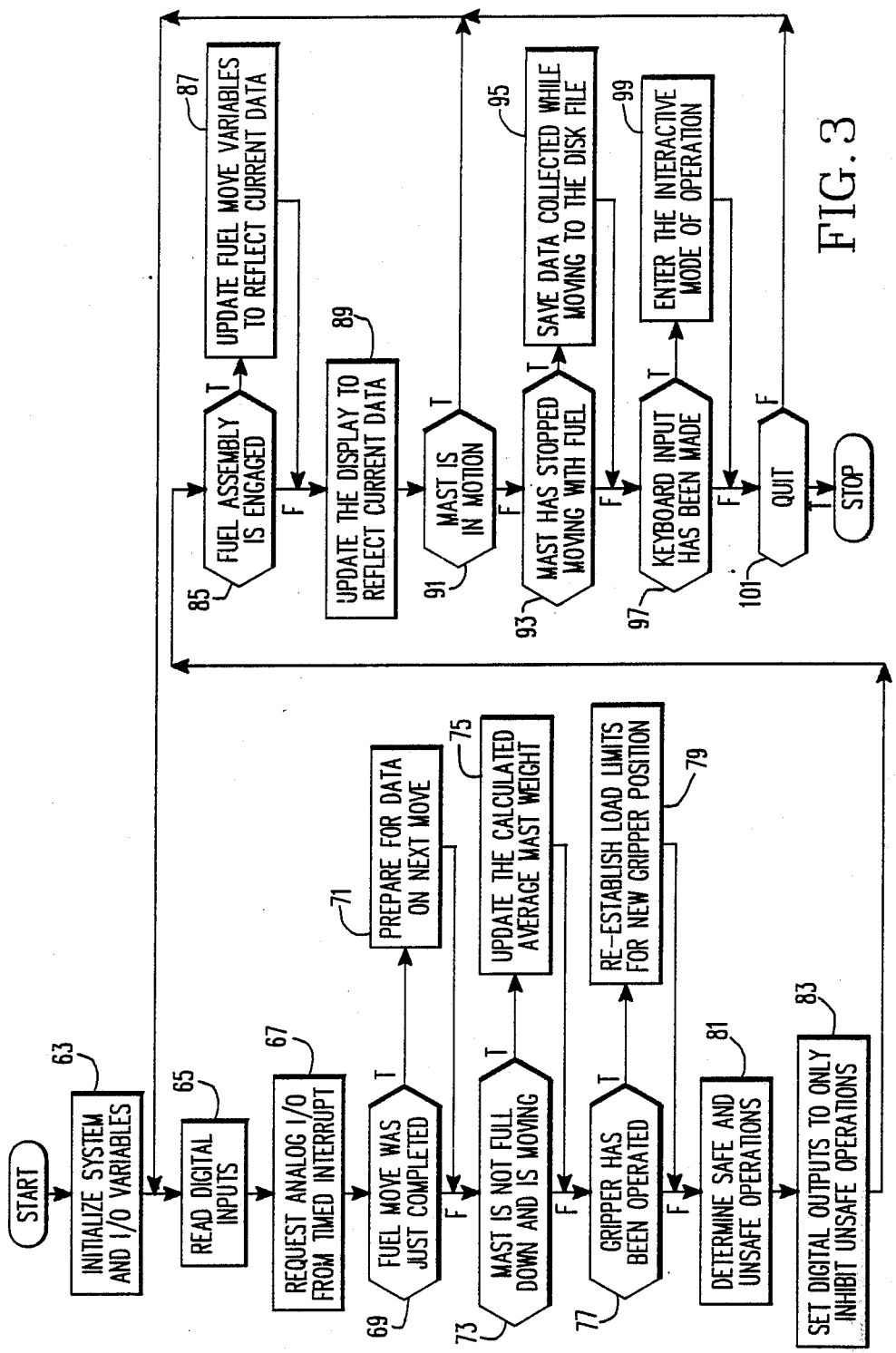
FIG. 3 illustrates a flow chart of a suitable main computer program which implements a part of the invention.
Figure 4:
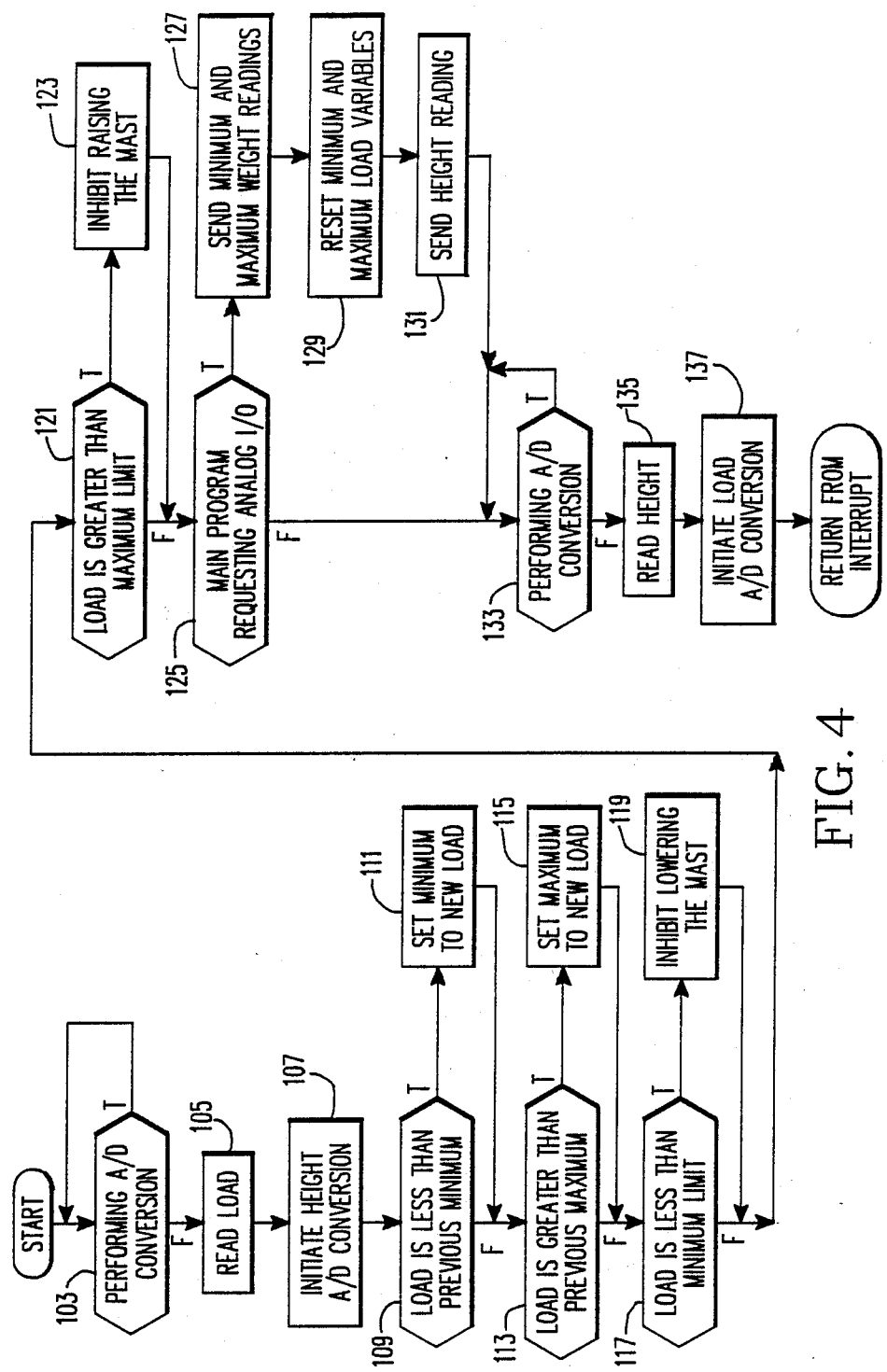
FIG. 4 and together illustrates a suitable timed interrupt program which implements a part of the invention.
Figure 5:
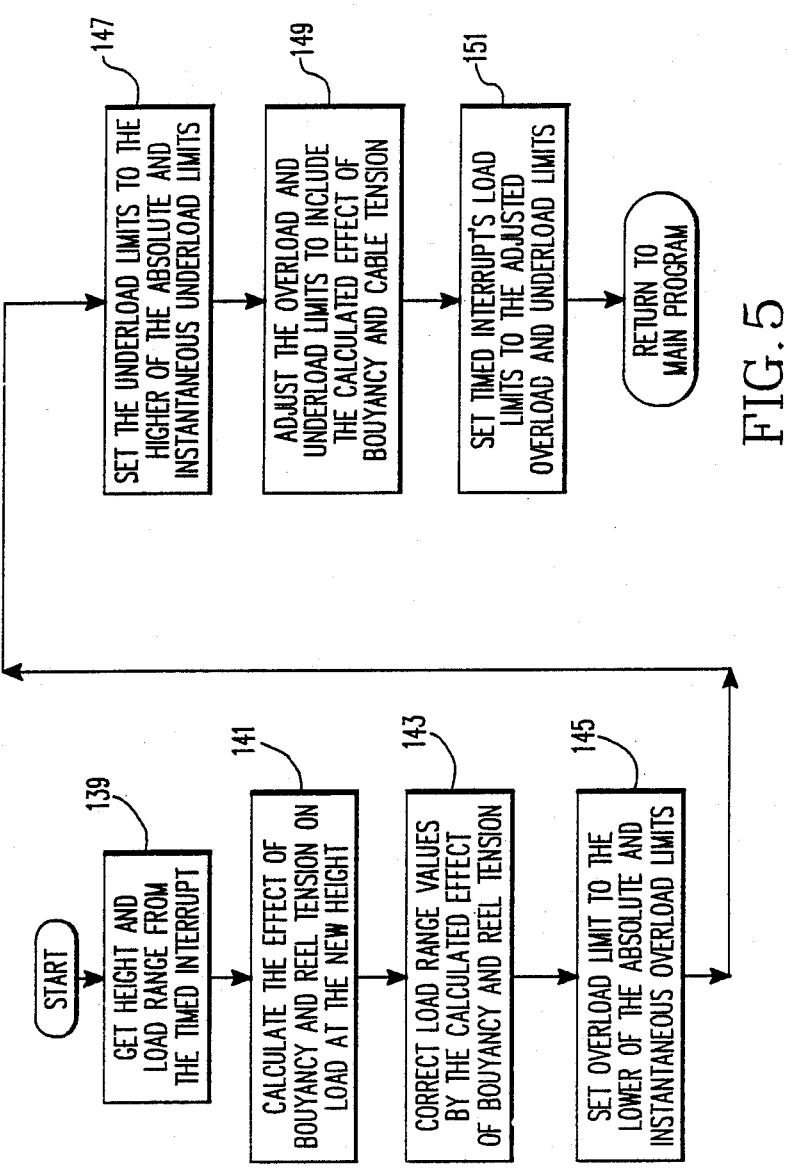
FIG. 5 illustrates a suitable request analog input/output program which implements another part of the invention.

FIGS. 3, 4, and 5 illustrate flow charts of an exemplary program for the computer 53. Since frequent comparisons of load to the limits must be made to prevent damage due to overload or underload conditions, the tasks are divided between a tuned interrupt program dedicated to comparing the measured load to the limits, and a main program which performs functions which are not as time critical such as calculating the running average, generating a visual display, storing data and interacting with the operator.

A request analog input/output program which is called by the main program transfers data between the timed interrupt and main programs and applies the corrections for changes in loading with height. In the exemplary system, the timed interrupt program is run 75 times per second while the main program only runs four times per second, and hence, the request analog input/output program is called four times per second.

Upon entry of the main program shown in FIG. 3, the system and input/output variables are initialized at 63. Digital inputs comprising gripper position, and bridge and trolley position are read at 65. The Request Analog I/O program illustrated in FIG. 5 is then called at 67 to acquire analog inputs from, and transmit analog outputs to the timed interrupt program which is illustrated in FIGS 4a and b.

If transfer of a fuel assembly 7 has just been completed, as determined at 69 by indications that the gripper 33 has been opened and the gripper mast 23 has been raised up off the fuel assembly, the running average load value is reset at 71 for the next move. If transport of a fuel assembly 7 is still in progress as detected at 73 by indications that the gripper mast is not full down and is still moving, the running average of the suspended load is updated at 75 using the techniques discussed above. In calculating the average load, the minimum and maximum loads received from the interrupt program are first averaged.

If the gripper 33 has been operated, that is engaged or released, as detected at 77, the load limits are reset for the new configuration at 79. Obviously, the limits are substantially different when the mast is not carrying a fuel assembly. Next, safe and unsafe operations are determined at 81. For instance, the gripper should not be released if there is too much load still on the gripper mast indicating that the fuel assembly is not properly seated for support without the mast. Digital outputs are set at 83 to inhibit such unsafe operations. Hence, in the above example, a signal is sent to the console which prevents opening of the gripper. The main program also checks at 81 that the load limits are not exceeded; however, as will be seen, primary responsibility for inhibiting refueling machine movements on overload and underloads rests with the interrupt program.

As long as a fuel assembly is engaged, as determined at 85 in FIG. 3, the fuel move variables are updated at 87 to reflect the current data. For instance, the new high and low load values, the height and time are temporarily stored in addition to any current trip information. Following this, the display is updated at 89. If the mast is still in motion as determined at 91, the program loops back to read the next set of digital inputs at 65. If the mast has stopped moving with a fuel assembly engaged, as at 93, the data collected while the gripper mast was moving is transferred to disk files at 95 to create a non-volatile record.

Next a determination is made at 97 whether there are any keyboard inputs from the operator. If so, the interactive mode is entered at 99. In this mode, identification of the configuration of the fuel cell to be transported can be entered by the operator. In addition, field programming can be effected by the operator in this mode. It is not possible to move the mast while the load control system is in the interactive mode.

Finally, if instructions related to transport of another fuel assembly have been entered, the program loops back at 101 to read the current digital inputs at 65. The operator can terminate operation by entering an instruction to exit the main program.

The timed interrupt program is shown in FIG. 4. This program is called every 13.3 milliseconds. One of its functions is to control the analog to digital conversion of the load and height signals received from the load cell 31 and position transducer 45 respectively. These conversions, which take time, are performed by hardware. At the beginning of the interrupt program conversion of the height analog signal is initiated at 107. This conversion is performed while the interrupt program is being run and is read at 135 at the end of the program. Similarly, analog to digital conversion of the load signal is initiated at the end of the interrupt program at 137 and performed while portions of the main program are being run. Hence, digital load data is read at the beginning of the next run of the interrupt program at 105. The height and load data are sampled at the same instant, but are converted and read into the computer 53 sequentially.

If the load analog to digital conversion is still in progress at the start of the timed interrupt program, the program loops at 103 until the conversion is complete. Since the timed interrupt program is run 19 times between runs of the main program, the minimum and maximum loads detected during these successive runs of the timed interrupt program are recorded at blocks 109, 111, 113 and 115. The current actual load for each run of the timed interrupt program is then compared with the minimum limit at 117. If the actual load is less than this minimum limit, lowering of the mast is inhibited at 119. Similarly, the current load is also compared with the maximum load limit at 121 in FIG. 4b, and if it is greater, raising the mast is inhibited at 123.

If the main program is requesting analog input/output information, as determined at 125, the minimum and maximum load readings since the last request are transferred to the main program at 127, and the minimum and maximum load variables are reset at 129, and the height reading is transmitted at 131. The minimum and maximum loads observed since the last call for data by the main program are saved so that it is known at what load values any trips occurred. As in the case of digitizing the analog load signal, if conversion of the analog height signal is not completed at this point, the program loops at 133 until the new height can be read at 135. Analog to digital conversion of the load signal is then initiated at 137 prior to exiting the timed interrupt program as discussed above.

The Request Analog I/O program flow chart is shown in FIG. 5. This program requests the load and height data from the timed interrupt program at 139. The calculations for changes in load due to the effects of buoyancy and reel tension at the new height are made at 141 by interpolating or extrapolating from the stored empirical data. Corrections to the minimum and maximum load values received from the interrupt program for the effects of buoyancy and reel tension are made at 143. The overload limit is then set to the lower of the absolute (manufacturer's) and instantaneous (running average plus margin) overload limits at 145. Similarly, the underload limit is set to the higher of the absolute and instantaneous underload limits at 147. Next, these overload and underload limits are adjusted to include a calculated effect of buoyancy and reel tension at 149, and the timed interrupt program's load limits are set to these adjusted overload and underload limits at 151.

Figure 6:
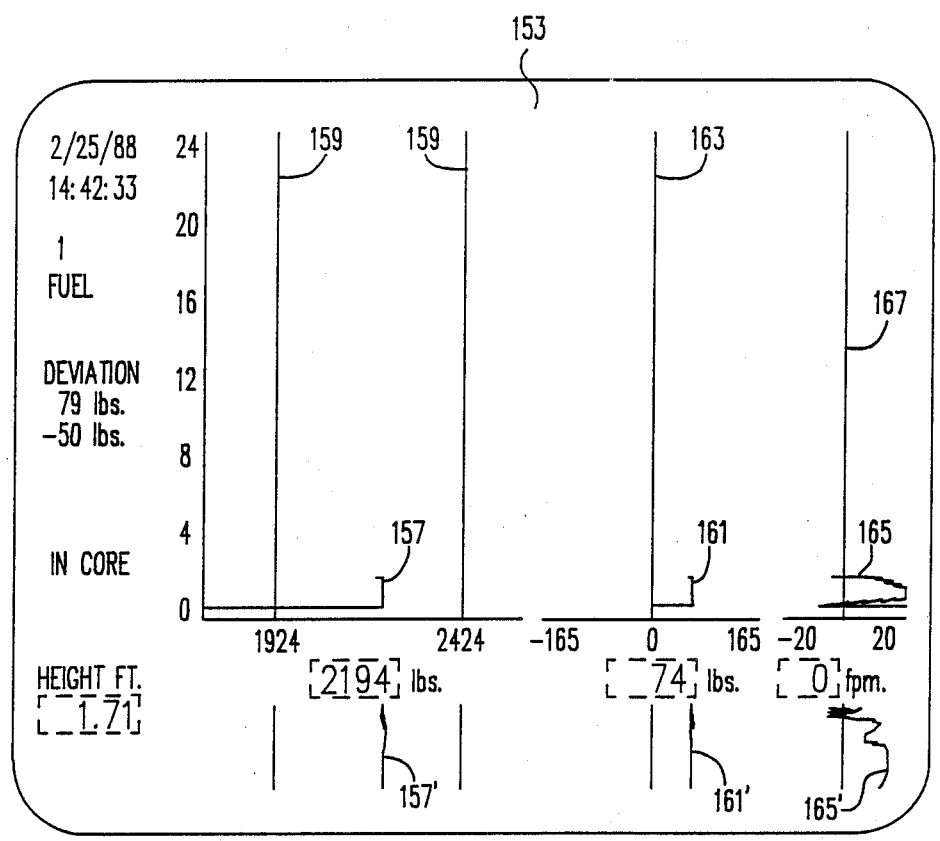
FIG. 6 is a computer display generated in accordance with the invention.

The visual display 153 generated on the monitor 155 of the computer 153 is shown in FIG. 6. This display provides a comprehensive presentation of the status of the fuel transfer operation. Pertinent data is shown on the left side of the display 153. Starting from the top, this can include: the date and time, the step in the fuel transfer procedure (1 in the example), an indication that a fuel assembly is being transported (if desired the fuel assembly identifier and configuration can also be presented), the maximum positive and negative deviation from the running average load (in this case 79 pounds in the 5 direction of an overload and 50 pounds in the direction of an underload); the location of the refueling machine (in the core in the example, could also indicate "In Path" if in the transfer system, or be blank if at the RCC change fixture), and the height above the zero setting (1.71 feet shown in reverse video in the example).

The left hand side of the graphics portion of the display 153 presents a plot of height versus the current load between the fixed manufacturer's limits represented by the vertical lines 159. The trace 157 illustrates the history of this value. The current load is presented digitally in reverse video below the trace 157, and the fixed overload and underload limits are presented digitally under the limit lines 159. To the right of the height versus current load plot is a second plot showing deviation 161 from the running average load value. The running average is represented by the vertical line 163. Deviations to the right of line 163 are in the direction of an overload, while excursions to the left indicate and underload condition. The current overload and underload margins (+165 and −165) from the running average are displayed digitally on the plot. In addition, the current deviation (+74 lbs.) is shown in reverse video under the line 163.

Finally, on the right side of the display 153 is a plot 165 of the speed of the gripper mast 23 between digitally presented limits (+ and −20 feet per minute). Again the current value (0 fpm) is presented in reverse video below a vertical line 167 representing zero speed.

Below each of the plots described above is an expanded view 157', 161' and 165' of a section of that plot.

Each view is a "window" of that section of the plot above it which shows, with much higher resolution, the area of the plot where the hoist is currently functioning. This "window" moves along with the trace on the larger plot, and is always positioned so as to display the maximum amount of the most recent operating data.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. Apparatus for transferring fuel assemblies to and from a nuclear reactor core said apparatus comprising:
   a gripper mast;
   means for raising and lowering said gripper mast;
   gripper means carried by the mast for engaging fuel assemblies;
   load sensing means for measuring the loads suspended by the means raising and lowering the gripper mast including the weight of the gripper mast, the gripper means, and any fuel assembly engaged by the gripper means; and
   digital computer means programmed: to repetitively at spaced intervals of time generate a current sample of the load measured by the load sensing means, to generate a running average of the measured load from successive current load samples, to generate load limits as a function of said running average of the measured load, to compare the current load sample with said load limits and to inhibit operation of said means for raising and lowering the gripper mast when said current sample is outside said limits.

2. The apparatus of claim 1 wherein said digital computer means is programmed to generate an overload limit and an underload limit by adding and subtracting respectively predetermined selected loads to and from said running average respectively, to compare said current measured load with each of said limits, and to inhibit operation of said means raising and lowering the gripper mast when the current load is greater than the overload limit and less than the underload limit.

3. The apparatus of claim 2 adapted for use in transferring fuel assemblies to and from a reactor core which is immersed in a pool of water and wherein buoyancy of the gripper mast varies with the degree of immersion of the gripper mast in the pool of water as it is raised and lowered, said apparatus including height sensing means for sensing the height of the gripper means carried by the gripper mast from said reactor core, and wherein said digital computer means is programmed to adjust said overload and underload limits for changes in the buoyancy of said gripper mast as a function of said height measured by the height measuring means.

4. The apparatus of claim 3 including servicing lines connected to and providing service to said gripper means, and spring tensioned reel means for said service lines which apply a tension load to said gripper mast which is a function of the measured height of said gripper mast and wherein said digital computer is programmed to adjust said overload and underload limits for changes in tension loading as a function of the height measured by said height measuring means.

5. The apparatus of claim 2 including height sensing means for measuring the height of the gripper means carried by the gripper mast from said reactor core, service lines connected to and providing service to said gripper means, and spring tensioned reel means for said service lines which apply a tension load to said gripper mast which is a function of the measured height of said gripper mast and wherein said digital computer is programmed to adjust said overload and underload limits for changes in tension loading as a function of the height measured by said height measuring means.

6. The apparatus of claim 2 wherein the digital computer is programmed to generate said running average of the measured load as the average value of a preselected number of the most recent load samples prior to the current sample.

7. The apparatus of claim 2 wherein the digital computer is programmed to generate the running average as previously generated of the measured load by adding to said running average a preselected fraction of the difference between said running average as previously generated and the value of the current sample.

8. The apparatus of claim 4 wherein said means for raising and lowering said gripper mast includes a cable connected to said gripper mast, a hoist for reeling said cable in and out to raise and lower said gripper mast and a cable sheave over which said cable is reeved between said gripper mast and said hoist, said sheave being supported by said load sensing means such that the suspended portion of the cable is measured by the load sensing means as part of the load, and wherein said digital computer means is programmed to adjust said overload and underload limits for changes in the amount of suspended cable as a function of said height measured by the height measuring means.

9. Apparatus for transferring fuel assemblies to and from a nuclear reactor core immersed in a pool of water, said apparatus comprising:
   a gripper mast;
   cable means for raising and lowering said gripper mast;
   gripper means carried by the mast for engaging fuel assemblies;
   load sensing means for measuring the loads suspended by the cable means including the weight of the gripper mast, the gripper means and any fuel assembly engaged by the gripper means;
   height measuring means for measuring the height of the gripper means carried by the gripper mast for said reactor core;
   control means comparing the load sensed by the load sensing means with selected load limits and to inhibit operation of said cable means when said measured load is outside said limits, and means for adjusting said load limits for changes in the buoyancy of said gripper mast as a function of said height measured by the height measuring means.

10. The apparatus of claim 9 including servicing lines connected to and providing service to said gripper means, and spring tensioned reel means for said service lines which apply a tension load to said gripper mast which is a function of the measured height of said gripper mast, and wherein said control means adjust said load limits for changes in tension loading as a function of the height measured by said height measuring means.

11. The apparatus of claim 10 wherein said cable means includes a cable connected to said gripper mast, a hoist for extending and retracting said cable to raise and lower said gripper mast and a cable sheave over which said cable is reeved between said gripper mast and said hoist, said sheave being supported by said load sensing means such that the sensed load includes the weight of the suspended cable and wherein said control means includes means to adjust said load limits for changes in the suspended portion of the cable as a function of the height measured by said height measuring means.

12. A method of monitoring the suspended load supported by a nuclear reactor refueling machine and transferring fuel assemblies to and from a reactor core comprising the steps of:

repetitively measuring the suspended load supported by the refueling machine;

generating a running average of the suspended load from the repetitive measurement of suspended load; and comparing the current value of the suspended load with said running average and inhibiting operation of the refueling machine when said current value differs from said running average by more than a selected limiting amount.

13. The method of claim 12 wherein operation of the refueling machine is inhibited when the current value of the suspended load differs from said running average by an amount which exceeds an overload limit and when it exceeds an underload limit.

14. The method of claim 12 including measuring the height of the suspended load and only using a measurement of the suspended load in generating said running average if the height at which the load measurement is taken has changed by a predetermined amount from the height at which the previous suspended load measurement was taken.

15. The method of claim 12 wherein said running average is generated by repetitively averaging a preselected number of the most recent measurements of the suspended load.

16. The method of claim 12 in which said running average is generated by adjusting the running average as previously generated by a preselected proportion of the difference between the running average as previously generated and the current measurement of the suspended load.

17. The method of claim 12 adapted for use with a refueling machine in which the measured suspended load varies by an amount which is a function of the height of the suspended load, and including measuring the height of the suspended load, and adjusting said limits by the amount that said suspended load varies at the measured height.

18. The method of claim 17 including determining the amount by which the suspended load varies as a function of height by moving the suspended load through full travel without any obstruction or hangups, and recording as a stored function the suspended load at selected heights, and wherein said adjusting the limits includes determining the amount by which the suspended load varies at the measured height from the stored function.

* * * * *